May 18, 1926.
L. M. WRAGG
WINDSHIELD
Filed Jan. 27, 1925
1,584,752
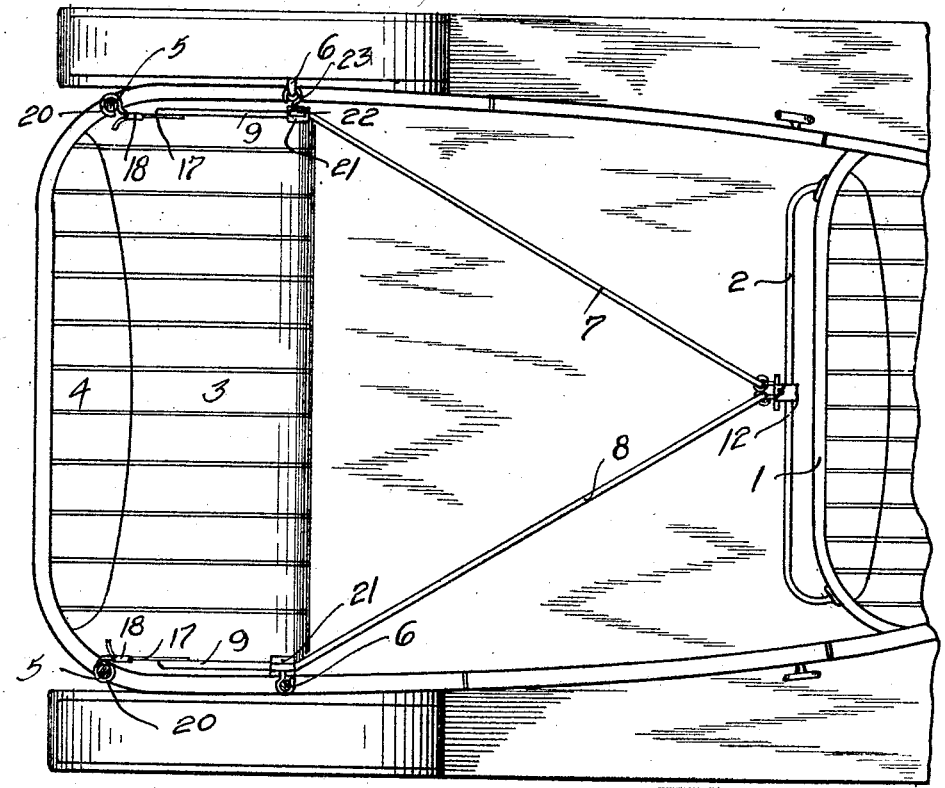
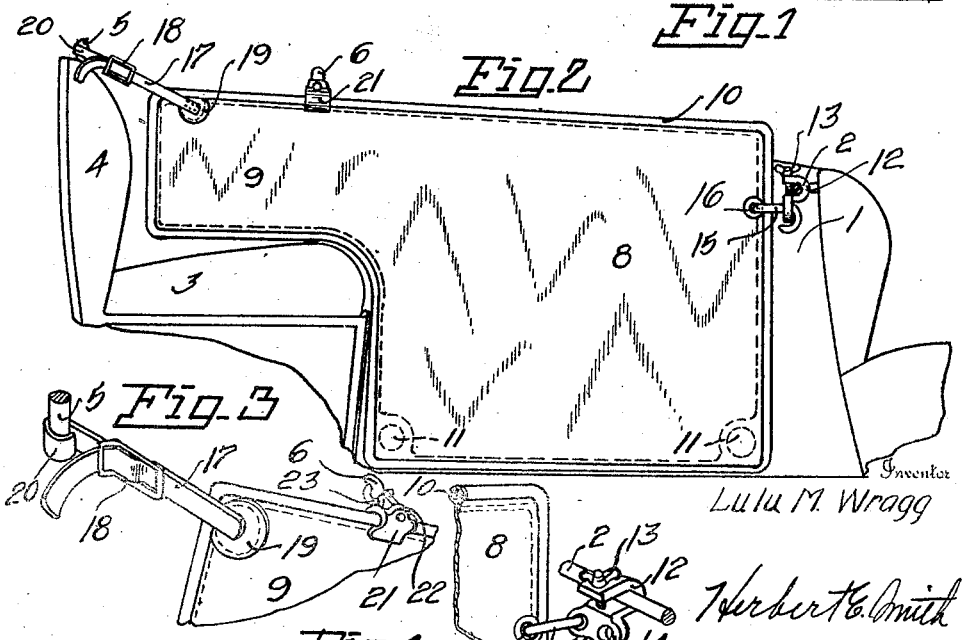
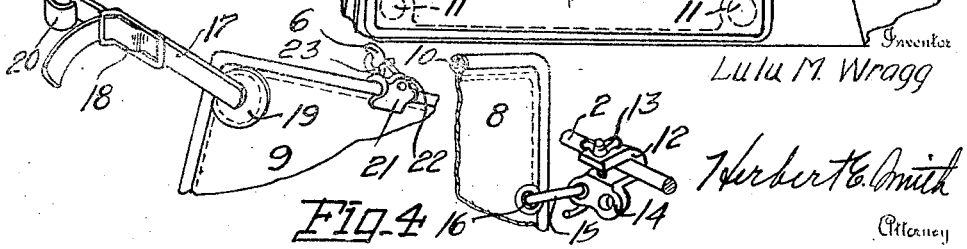

Patented May 18, 1926.

1,584,752

UNITED STATES PATENT OFFICE.

LULU M. WRAGG, OF SPOKANE, WASHINGTON.

WINDSHIELD.

Application filed January 27, 1925. Serial No. 5,033.

My present invention relates to an improved wind shield adapted especially for use by the occupants of the rear seat of an automotive vehicle in place of robes and to perform the functions of an enclosed automobile. The primary object of the invention is the production of an effective windshield for use in an open car or automobile for protecting, shielding, or guarding the lower extremities and bodies of the passengers in the rear seat and at the same time insuring them the privilege of a clear vision from the sides of the open car. The wind shield embodies a pair of complementary, flexible sections, preferably arranged on converging lines at the rear of the front seat, which may with convenience and facility be assembled for use and may with equal facility be dismantled or detached for egress from the car or for storage.

Means are provided for detachably connecting the converging front ends of the complementary sections of the shield to the robe rail or robe bar on the back of the front seat; for detachably securing the rear spaced ends of the sections; and adjustable means are employed in connection with the two sections for properly disposing or locating them in convenient and comfortable positions for accommodation of the passengers. When properly positioned the shields are designed to deflect the air currents caused by the traveling car and thus protect the passengers.

The invention consists in certain novel combinations and arrangements of parts as will be hereinafter more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a top plan view of so much of an automobile as is necessary to illustrate the utility of my invention which is applied thereto in position for use.

Figure 2 is a side view of one of the complementary shield sections or aprons, showing the manner of attaching it to its supports.

Figure 3 is a perspective detail view showing the manner of fastening or attaching the rear ends of the aprons, and for adjustably anchoring the apron at an intermediate point.

Figure 4 is a detail perspective view showing the attaching device for the front ends of the converging aprons.

In order that the general arrangement of parts and utility of my invention may readily be understood I have shown in Figures 1 and 2 the back portion 1 of the front seat of the open car, and the hinged or pivoted robe rail 2 on the seat back and which extends transversely of the car in usual manner. The rear seat is designated 3 and its back 4, while the supporting posts or uprights 5 of the top portion of the car are also shown and used in assembling the windshield. At opposite sides of the body of the car and at the top edges thereof I utilize two stationary supports or studs 6 which supports may also be posts of the car top.

The complementary shield sections or aprons are designated 7 and 8 and are fashioned of suitable flexible material that is durable and is well calculated to deflect the air currents striking against the aprons. These aprons are of a height preferably to reach approximately to the shoulders of the occupants of the rear seat and extend to the floor of the car between the front and rear seats. Each apron is cut out at its rear lower corner to form an extension 9 that projects over the rear seat along the side upholstering of the body of the car. The material of which the aprons are composed is flexible so that they may be folded for compactness and convenience in storing them in a pocket or in other places provided therefor when not in use.

The aprons may be of two or more plies or thicknesses if desired and around the entire edge of each apron a flexible but strong binding cord, wire, or other suitable brace as 10 sewn to reinforce the aprons, and at the lower edges of the skirts of the aprons weights as 11 may be carried to give them stability.

The complementary aprons preferably converge at their front ends and are fastened or attached to a clevis 12 which is adjustable on the robe rail 2 and by means of clamping bolt 13 may be secured thereon in adjusted position, as at the longitudinal center of the rail indicated in Figure 1. This clevis has a perforated flange 14 to accommodate a pair of hooks 15 which are anchored by eyes 16 to the respective aprons near their front upper corners.

At their rear ends the extensions 9 of the aprons are provided with straps 17 and adjusting buckles 18, the former being secured to reinforcing pads 19 on the extensions. The straps each has a hook as 20 for engagement around the upright or post 5 at each side of the car.

These devices form respectively the front and rear attaching or fastening means for the aprons and in combination with them I utilize an adjustable anchoring and attaching device by means of which the relative lengths of the converging portions and extensions of the aprons may be adjusted for various sizes of cars and for the convenience of the passengers in the car.

On the top edge of each apron, a slidable, adjustable, anchoring clamp 21 is attached, which is clamped over the binding edge of the apron with sufficient friction to hold it in adjusted position and prevent displacement of the device. Each clamp is provided with a perforated ear 22 and a hook 23 is anchored in the ear for engagement with the stationary support, as a stud, 6 on the body of the car. By shifting or sliding this clamp on the top edge of the apron it will be apparent that the length of the converging portion of the apron and the length of the parallel extensions may be adjusted for the convenience of the passengers or occupants of the rear seat, and the angle of convergence of the front portions of the aprons may be varied.

The lower edges of the aprons may assume natural positions and the closed side doors of the car will prevent air currents passing under the lower edges of the aprons, while the aprons and their extensions where exposed to the wind will deflect the air currents to pass out at the sides of the car and shield the occupants of the rear seats. By detaching one of the front hooks 15 an apron may be displaced to permit egress from or ingress to the car, and in some instances one of the aprons may be dispensed with if desired, especially when wind or rain is blowing in only from one side of the car.

Having thus fully described my invention what I claim as new and desire to secure by Letters Patent is—

1. A windshield for automobiles comprising a pair of flexible aprons having converging front ends and spaced parallel rear ends and detachable fastening means therefor, a single fastening member and detachable connections co-acting therewith on the converging front ends of said aprons, intermediate slidable clamps on the rear ends of the aprons to maintain them at an angle to the front converging ends, and detachable anchoring devices on said clamps.

2. A windshield for automobiles comprising a pair of flexible aprons having converging front ends and upper, rear, parallel extensions and detachable fastening means therefor, a single fastening member and detachable connections co-acting therewith on the front ends, reinforced edges on said extensions, intermediate slidable clamps on said reinforced edges to maintain the extensions at an angle to the front ends, and detachable fasteners for said clamps.

In testimony whereof I affix my signature.

LULU M. WRAGG.